(12) United States Patent
Takechi et al.

(10) Patent No.: US 12,270,782 B2
(45) Date of Patent: Apr. 8, 2025

(54) ION SENSING DEVICE

(71) Applicant: TIANMA JAPAN, LTD., Kanagawa (JP)

(72) Inventors: Kazushige Takechi, Kanagawa (JP); Shinnosuke Iwamatsu, Yamagata (JP); Hiroki Murayama, Yamagata (JP); Yoshiyuki Watanabe, Yamagata (JP)

(73) Assignee: TIANMA JAPAN, LTD., Kanagawa (JP)

( * ) Notice: Subject to any disclaimer, the term of this patent is extended or adjusted under 35 U.S.C. 154(b) by 705 days.

(21) Appl. No.: 17/533,239

(22) Filed: Nov. 23, 2021

(65) Prior Publication Data

US 2022/0187238 A1 Jun. 16, 2022

(30) Foreign Application Priority Data

Dec. 16, 2020 (JP) .................. 2020-208837

(51) Int. Cl.
*G01N 27/414* (2006.01)
(52) U.S. Cl.
CPC .................. *G01N 27/4145* (2013.01)
(58) Field of Classification Search
None
See application file for complete search history.

(56) References Cited

U.S. PATENT DOCUMENTS

| | | | | |
|---|---|---|---|---|
| 5,309,085 A | * | 5/1994 | Sohn ................. | G01N 27/4145 324/705 |
| 7,888,708 B2 | * | 2/2011 | Yazawa ............... | G01N 27/414 257/253 |
| 9,518,953 B2 | * | 12/2016 | Nemirovsky ...... | G01N 27/4146 |
| 11,639,913 B2 | * | 5/2023 | Kawachi ............. | G01N 27/414 422/50 |
| 11,846,604 B2 | * | 12/2023 | Sekine ............... | G01N 27/4145 |

(Continued)

FOREIGN PATENT DOCUMENTS

CN 109580736 A 4/2019
JP 5-80026 A 3/1993

(Continued)

OTHER PUBLICATIONS

Communication dated Dec. 7, 2023, issued in Chinese Application No. 202111411854.5.

(Continued)

*Primary Examiner* — Thomas J. Hiltunen
(74) *Attorney, Agent, or Firm* — Sughrue Mion, PLLC

(57) ABSTRACT

An ion sensing device includes a first field-effect transistor, a second field-effect transistor, a reference electrode configured to directly contact a sample solution, a first ion-sensitive film, and a second ion-sensitive film. Each of the first field-effect transistor and the second field-effect transistor includes a semiconductor film, a bottom gate electrode, a bottom gate insulating film located between the bottom gate electrode and the semiconductor film, and a top gate insulating film. Surface materials in contact with the sample solution for the first ion-sensitive film and the second ion-sensitive films are the same. A sensitivity of the combination of the first field-effect transistor and the first ion-sensitive film is higher than a sensitivity of the combination of the second field-effect transistor and the second ion-sensitive film.

9 Claims, 12 Drawing Sheets

(56) References Cited

U.S. PATENT DOCUMENTS

| | | | |
|---|---|---|---|
| 2013/0056353 A1 | 3/2013 | Nemirovsky et al. | |
| 2015/0276663 A1 | 10/2015 | Takechi et al. | |
| 2017/0059513 A1* | 3/2017 | Afzali-Ardakani | ................... G01N 27/4145 |
| 2019/0063968 A1 | 2/2019 | Bretthauer et al. | |
| 2019/0330674 A1 | 10/2019 | Takechi et al. | |
| 2023/0213474 A1* | 7/2023 | Zhang | ............... H01L 21/76829 257/253 |

FOREIGN PATENT DOCUMENTS

| | | |
|---|---|---|
| JP | 2000-187016 A | 7/2000 |
| JP | 2009-025124 A | 2/2009 |
| JP | 2015-190848 A | 11/2015 |
| JP | 2016-103577 A | 6/2016 |
| WO | 2008/118919 A1 | 10/2008 |

OTHER PUBLICATIONS

Office Action issued May 31, 2024 in Chinese Application No. 202111411854.5.

Office Action issued Jul. 9, 2024 in Japanese Application No. 2020-208837.

* cited by examiner

ION SENSING DEVICE

CROSS-REFERENCE TO RELATED APPLICATIONS

This non-provisional application claims priority under 35 U.S.C. § 119(a) on Patent Application No. 2020-208837 filed in Japan on Dec. 16, 2020, the entire content of which is hereby incorporated by reference.

BACKGROUND

This disclosure relates to an ion sensing device.

Ion sensors that selectively respond to a specific kind of ions in a sample solution to generate an electrode potential corresponding to the concentration of the ions are used in various fields including chemical, biological, and medical fields. For example, JP 2009-25124 A discloses a solid-state ion sensor utilizing differential operation of an ion-sensitive field-effect transistor (ISFET) as a structure that does not include liquid junction type of ion electrode and reference electrode.

SUMMARY

An aspect of this disclosure is an ion sensing device including: a first field-effect transistor; a second field-effect transistor; a reference electrode configured to directly contact a sample solution; a first ion-sensitive film; and a second ion-sensitive film. Each of the first field-effect transistor and the second field-effect transistor includes: a semiconductor film; a bottom gate electrode; a bottom gate insulating film located between the bottom gate electrode and the semiconductor film; and a top gate insulating film. The first ion-sensitive film is configured to generate a top gate potential with respect to the semiconductor film of the first field-effect transistor in accordance with an ion concentration of the sample solution when being in direct contact with a sample solution. The second ion-sensitive film is configured to generate a top gate potential with respect to the semiconductor film of the second field-effect transistor in accordance with the ion concentration of the sample solution when being in direct contact with the sample solution. A potential of the reference electrode is supplied to a source/drain of the semiconductor film of each of the first field-effect transistor and the second field-effect transistor. Surface materials in contact with the sample solution for the first ion-sensitive film and the second ion-sensitive films are the same. A sensitivity of the combination of the first field-effect transistor and the first ion-sensitive film is higher than a sensitivity of the combination of the second field-effect transistor and the second ion-sensitive film.

It is to be understood that both the foregoing general description and the following detailed description are exemplary and explanatory and are not restrictive of this disclosure.

EMBODIMENTS

Figure 1:
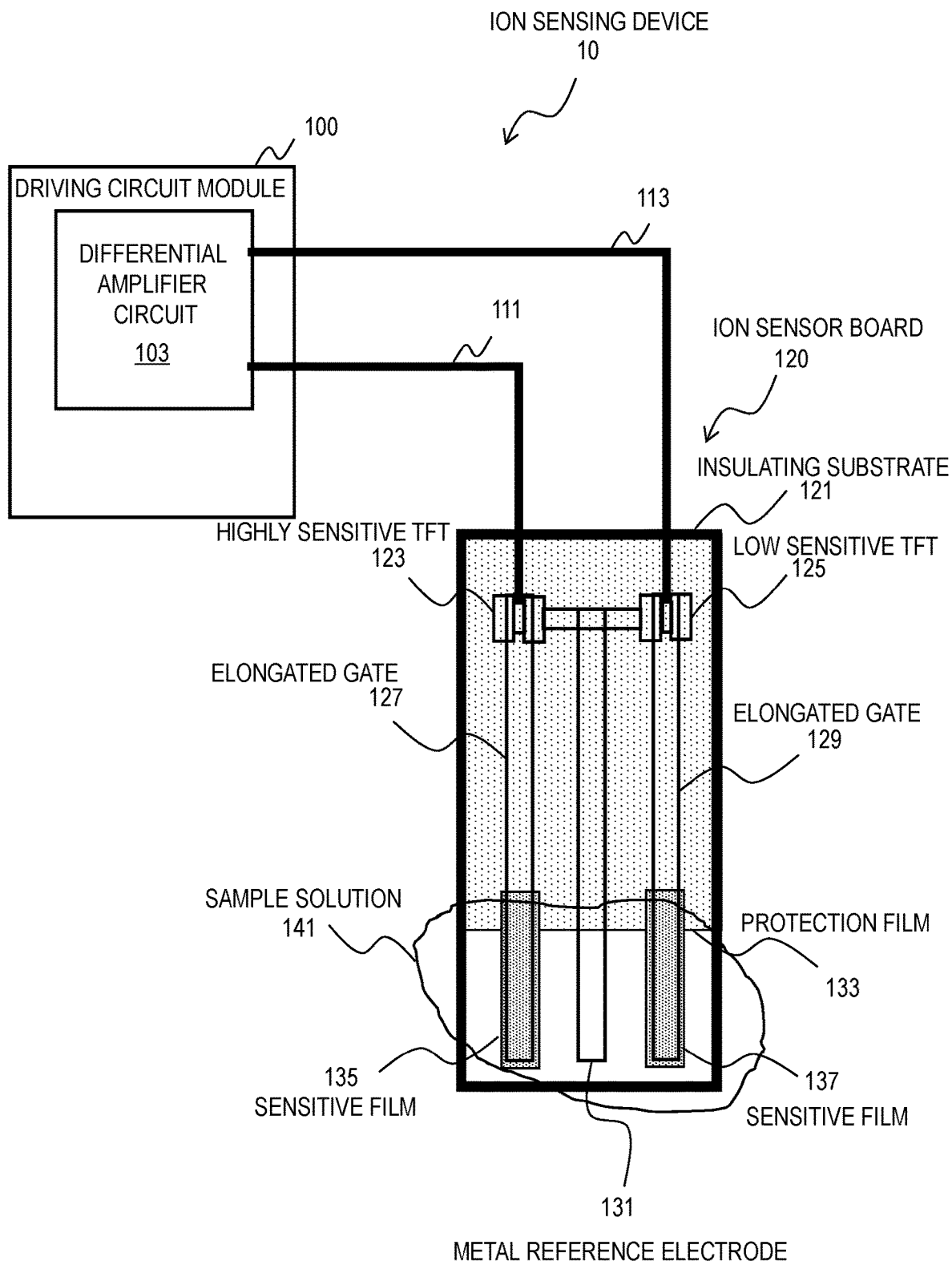
FIG. 1 schematically illustrates an example of the overall configuration of an ion sensing device in an embodiment.

Hereinafter, embodiments of this disclosure will be described with reference to the accompanying drawings. The embodiments are merely examples to implement this disclosure and not to limit the technical scope of this disclosure.

Ion sensing devices for measuring the concentration of a specific kind of ions are used in various fields such as biotechnology and medical field. There is a known ion sensing device that detects an ion concentration using differential operation between an ion-sensitive field effect transistor (ISFET) and a non-ion-sensitive FET. However, producing a perfect non-ion-sensitive film is technically very difficult; the sensitivity of this ion sensing device depends on the sensitivity a of the uncertain non-ion-sensitive film.

Meanwhile, the ion-sensitive film and the non-ion-sensitive film that contact a sample solution are made of different material and therefore, they are different in ion selectivity and tendency to drift, causing difficulty in accurate measurement. For example, assume that the ion-sensitive film has a characteristic that responds to hydrogen ions but does not to sodium ions and the non-ion-sensitive film has a characteristic that does not respond to hydrogen ions but does to sodium ions. When the concentrations of hydrogen ions and sodium ions in a sample solution change together, the ion sensor cannot correctly measure the change in the concentration of hydrogen ions, which is intended to be measured.

An ion sensing device in an embodiment of this specification includes two field-effect transistors and ion-sensitive films for the two field-effect transistors. The wetted material (surface material in contact with the sample solution) of the two ion-sensitive films is the same. The ion-sensitive films can have a single layer structure or a multi-layer structure. The parts of the two ion-sensitive films to contact a sample solution are made of the same material (wetted material).

For example, the ion-sensitive film for one field-effect transistor can be composed of a single layer of tantalum oxide and the ion-sensitive film for the other field-effect transistor can be composed of a wetted layer of tantalum oxide and an under layer of silicon oxide. In this case, the parts to contact a sample solution in both of the ion-sensitive films are made of tantalum oxide. The materials of ion-sensitive films of the parts to contact a liquid sample can be selected appropriately for the kind of ions to be measured. The field-effect transistors have a double gate structure including a bottom gate and a top gate. Each ion-sensitive film supplies a top gate potential corresponding to the ion concentration of a sample solution to the field-effect transistor associated therewith.

The device including one of the field-effect transistors and an ion-sensitive film associated therewith and the device including the other field-effect transistor and an ion-sensitive film associated therewith have different sensitivities for measuring the ion concentration. Using the devices having different sensitivities achieves an ion sensing device that can measure the ion concentration with high accuracy.

Overall Configuration of Ion Sensing Device

FIG. 1 schematically illustrates an example of the overall configuration of an ion sensing device in an embodiment. The ion sensing device 10 includes an ion sensor board 120 and a driving circuit module 100 for driving the ion sensor board 120. The driving circuit module 100 includes a differential amplifier circuit 103.

The ion sensor board 120 includes a flexible or inflexible insulating substrate 121 made of glass or resin. A highly sensitive thin-film transistor (TFT) 123 and a low sensitive TFT 125 are disposed on the insulating substrate 121. Each of the highly sensitive TFT 123 and the low sensitive TFT 125 outputs a signal in accordance with the concentration of specific ions in a sample solution 141 to the driving circuit module 100. The sensitivity to the specific ions of the highly sensitive TFT 123 is higher than that of the low sensitive TFT 125.

The highly sensitive TFT 123 and the low sensitive TFT 125 are covered with a protection film 133. As will be described later, the highly sensitive TFT 123 and the low sensitive TFT 125 have a double gate structure that includes a bottom gate located lower than an active semiconductor film and a top gate located upper than the active semiconductor film.

An elongated gate electrode 127 includes a top gate electrode of the highly sensitive TFT 123 and an extension part extending from the top gate electrode; it extends to the outside of the protection film 133 on the insulating substrate 121. An elongated gate electrode 129 includes a top gate of the low sensitive TFT 125 and an extension part extending from the top gate electrode; it extends to the outside of the protection film 133 on the insulating substrate 121. The tips of the elongated gate electrodes 127 and 129 exposed from the protection film 133 are covered with ion-sensitive films (also simply referred to as sensitive films) 135 and 137. The surfaces (wetted surfaces) of the ion-sensitive films 135 and 137 are of the same material.

In an example, the sources of the highly sensitive TFT 123 and the low sensitive TFT 125 are electrically connected and further, the sources are electrically connected with a metal reference electrode 131. These are at the same potential. The metal reference electrode 131 extends from the sources of the highly sensitive TFT 123 and the low sensitive TFT 125 to the outside of the protection film 133 and its tip is exposed.

The metal reference electrode 131, the sensitive film 135 on the elongated gate electrode 127, and the sensitive film 137 on the elongated gate electrode 129 are in contact with a sample solution 141 in the outside of the protection film 133. The potential of the metal reference electrode 131 is supplied to the sources of the highly sensitive TFT 123 and the low sensitive TFT 125. A potential generated by the sensitive film 135 is supplied to the elongated gate electrode 127 or the top gate of the highly sensitive TFT 123. A potential generated by the sensitive film 137 is supplied to the elongated gate electrode 129 or the top gate of the low sensitive TFT 125.

The highly sensitive TFT 123 and the low sensitive TFT 125 output their detection signals corresponding to the concentration of the specific ions in the sample solution 141 to the driving circuit module 100 through transmission lines 111 and 113. As will be described later, the bottom gate potentials of the highly sensitive TFT 123 and the low sensitive TFT 125 are the detection signals.

The differential amplifier circuit 103 of the driving circuit module 100 outputs the difference between the detection signals of the highly sensitive TFT 123 and the low sensitive TFT 125. The driving circuit module 100 outputs a measurement signal indicating the ion concentration based on the output of the differential amplifier circuit 103.

In the configuration example in FIG. 1, the TFTs 123 and 125 for measuring the ion concentration are disposed on the insulating substrate 121; therefore, the TFTs 123 and 125 can be located close to the sample solution 141. Furthermore, the TFTs 123 and 125 are covered with the protection film 133 to increase the reliability of the ion sensor board 120. Instead of the TFTs, MOSFETs on a silicon substrate can be used as another example of field-effect transistors. The same applies to the configuration examples of two TFTs described in the following.

Figure 2:
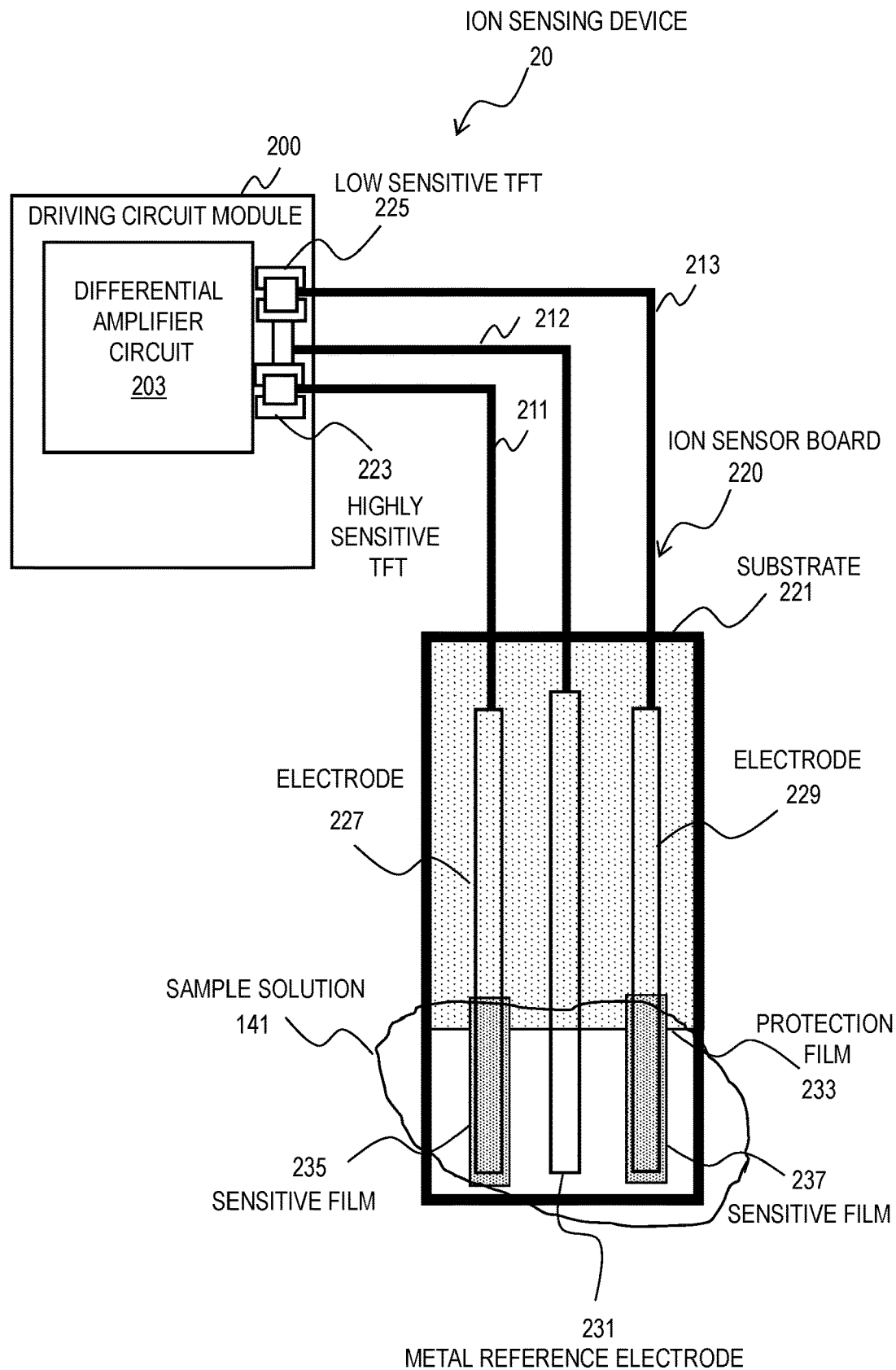
FIG. 2 schematically illustrates another example of the overall configuration of an ion sensing device in an embodiment.

FIG. 2 schematically illustrates another example of the overall configuration of an ion sensing device in an embodiment. The configuration example in FIG. 1 includes two TFTs 123 and 125 on the insulating substrate 121. The ion sensing device 20 in FIG. 2 has two TFTs 223 and 225 for measuring ions in a driving circuit module 200.

The ion sensing device 20 includes an ion sensor board 220 and a driving circuit module 200 for driving the ion sensor board 220. The driving circuit module 200 includes a differential amplifier circuit 203.

The ion sensor board 220 includes a flexible or inflexible insulating substrate 221 made of glass or resin. Electrodes 227 and 229, and a metal reference electrode 231 are disposed on the insulating substrate 221. The electrodes 227 and 229 are partially covered with a protection film 233 and their remaining parts are exposed to the outside of the protection film 233. In similar, the metal reference electrode 231 is partially covered with the protection film 233 and its remaining part is exposed to the outside of the protection film 233. The tips of the electrodes 227 and 229 exposed from the protection film 233 are covered with ion-sensitive films 235 and 237. The ion-sensitive films 235 and 237 are of the same material.

A highly sensitive TFT 223 and a low sensitive TFT 225 are disposed on the substrate of the driving circuit module 200. Each of the highly sensitive TFT 223 and the low sensitive TFT 225 outputs a signal in accordance with the concentration of specific ions in a sample solution 141 to a differential amplifier circuit 203 in the driving circuit module 200. The sensitivity to the specific ions of the highly sensitive TFT 223 is higher than that of the low sensitive TFT 225.

As will be described later, the highly sensitive TFT 223 and the low sensitive TFT 225 have a double gate structure that includes a bottom gate located lower than an active semiconductor film and a top gate located upper than the active semiconductor film.

The electrode 227 is electrically connected with the top gate electrode of the highly sensitive TFT 223 through a line 211. These are at the same potential. The electrode 229 is electrically connected with the top gate electrode of the low sensitive TFT 225 through a line 213. These are at the same potential.

In an example, the sources of the highly sensitive TFT 223 and the low sensitive TFT 225 are electrically connected and further, the sources are electrically connected with the metal reference electrode 231 through a line 212. These are at the same potential.

The metal reference electrode 231, the sensitive film 235 on the electrode 227, and the sensitive film 237 on the elongated gate electrode 229 are in contact with a sample solution 141 in the outside of the protection film 233. The potential of the metal reference electrode 231 is supplied to the sources of the highly sensitive TFT 223 and the low sensitive TFT 225. A potential generated by the sensitive film 235 is supplied to the electrode 227 or the top gate of the highly sensitive TFT 223. A potential generated by the sensitive film 237 is supplied to the electrode 229 or the top gate of the low sensitive TFT 225.

The highly sensitive TFT 223 and the low sensitive TFT 225 output their detection signals corresponding to the concentration of the specific ions in the sample solution 141 to the differential amplifier circuit 203. As will be described later, the bottom gate potentials of the highly sensitive TFT 223 and the low sensitive TFT 225 are the detection signals.

The differential amplifier circuit 203 outputs the difference between the detection signals of the highly sensitive TFT 223 and the low sensitive TFT 225. The driving circuit module 200 outputs a measurement signal indicating the ion concentration based on the output of the differential amplifier circuit 203.

Configuration of Sensor TFT Pair

Figure 3:
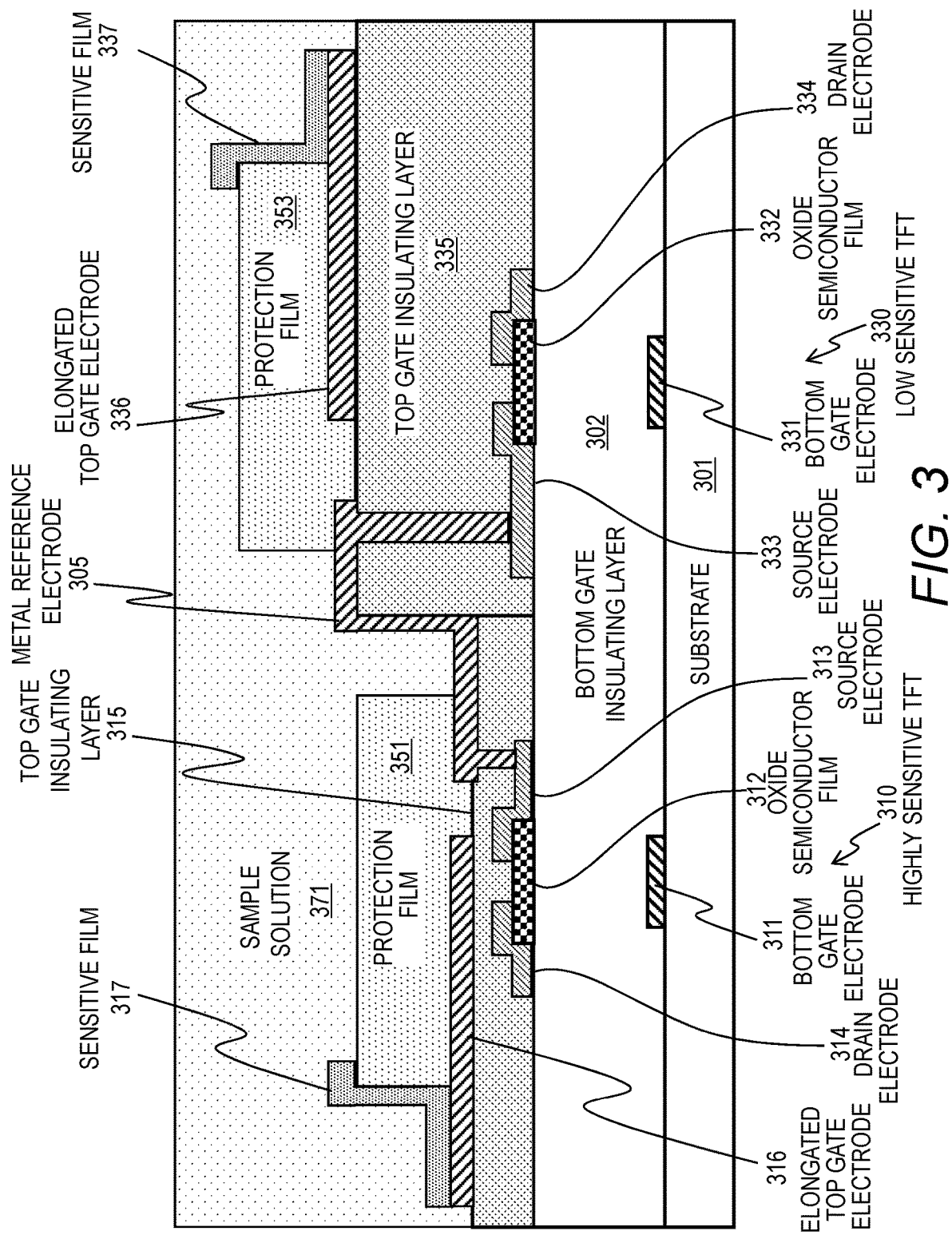
FIG. 3 is a cross-sectional diagram schematically illustrating an example of the structure of two TFTs for measuring the concentration of specific ions in a sample solution.
Figure 4:
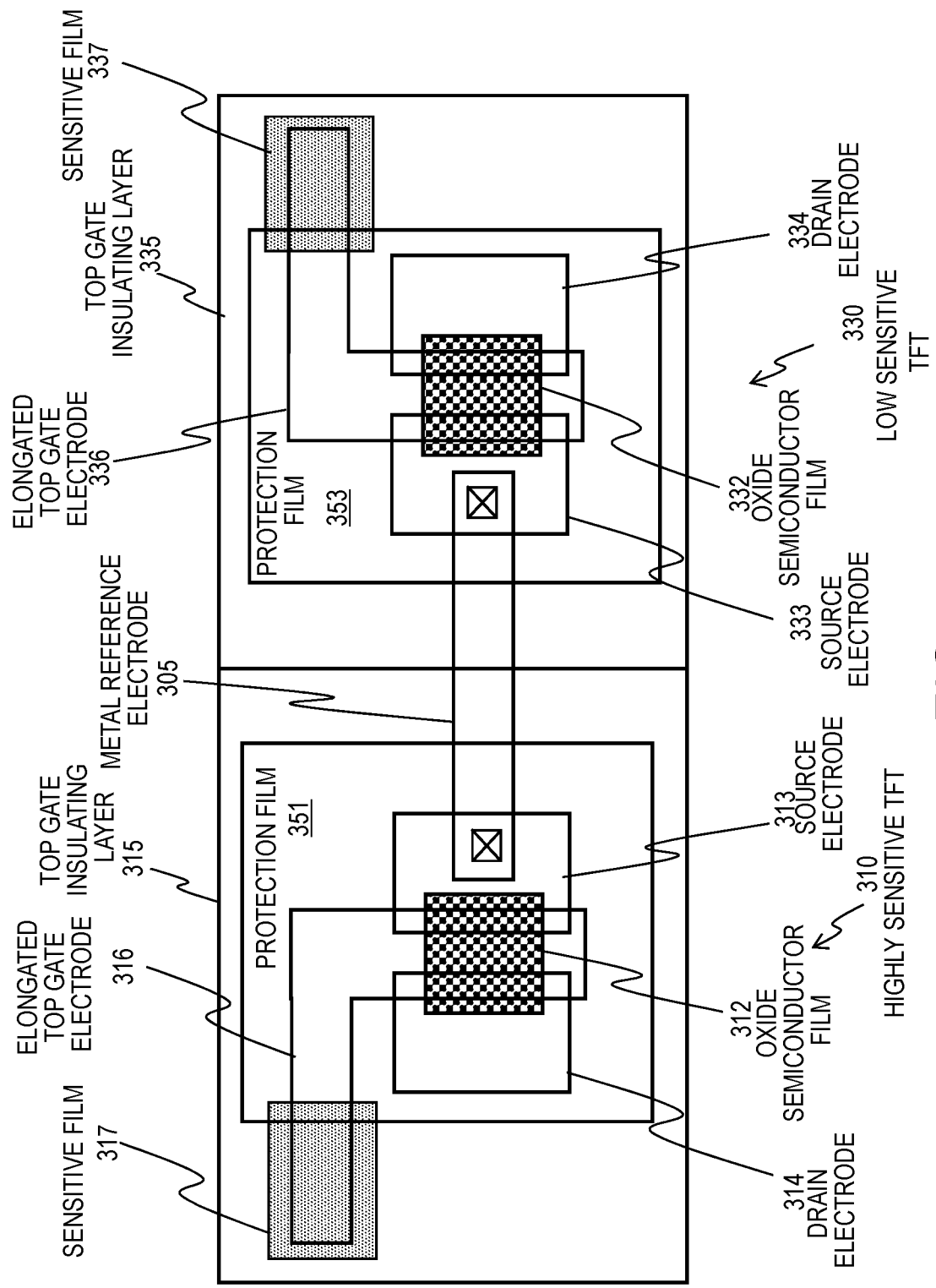
FIG. 4 is a plan diagram schematically illustrating the example of the structure of the two TFTs.

FIG. 3 is a cross-sectional diagram schematically illustrating an example of the structure of two TFTs (also referred to as a sensor TFT pair) for measuring the concentration of specific ions in a sample solution. FIG. 4 is a plan diagram schematically illustrating the example of the structure of the two TFTs. The configuration example in FIGS. 3 and 4 includes two TFTs disposed on an insulating substrate and covered with a protection film and elongated gate electrodes extending from the TFTs, like the configuration example in FIG. 1.

A highly sensitive TFT 310 and a low sensitive TFT 330 are disposed on an insulating substrate 301. The highly sensitive TFT 310 has a relatively high sensitivity to specific ions in a sample solution 371 and the low sensitive TFT 330 has a relatively low sensitivity to the specific ions in the sample solution 371.

The highly sensitive TFT 310 includes a bottom gate electrode 311 on the insulating substrate 301 and an oxide semiconductor film 312 located upper than the bottom gate electrode 311. In a planar view (when viewed along the normal to the substrate), the bottom gate electrode 311 overlaps the oxide semiconductor film 312. A part of a bottom gate insulating layer 302 is located between the bottom gate electrode 311 and the oxide semiconductor film 312. The bottom gate insulating layer 302 is in direct contact with the bottom gate electrode 311 and the oxide semiconductor film 312.

The material for the bottom gate electrode 311 can include tantalum, molybdenum, tungsten, aluminum, and the like. The bottom gate insulating layer 302 can be a silicon oxide film, a silicon nitride film, or a composite film obtained by stacking a plurality of these films. Examples of oxide semiconductor include amorphous InGaZnO (a-InGaZnO) and microcrystal InGaZnO. Other than these, an oxide semiconductor such as a-InSnZnO, a-InGaZnSnO, or ZnO can also be employed for the oxide semiconductor film 312. Instead of oxide semiconductor, amorphous silicon or polysilicon can also be employed.

The highly sensitive TFT 310 includes a source electrode 313 and a drain electrode 314 each in direct contact with a different end of the oxide semiconductor film 312. A part of the oxide semiconductor film 312 is exposed from the space between the source electrode 313 and the drain electrode 314. The materials listed for the bottom gate electrode 311 can be used for the source electrode 313 and the drain electrode 314.

A top gate insulating layer 315 covers the oxide semiconductor film 312, the source electrode 313, and the drain electrode 314. Further, an elongated top gate electrode 316 is disposed above the top gate insulating layer 315. The top gate insulating layer 315 can be a silicon oxide film, a silicon nitride film, or a stack of these films. The elongated top gate electrode 316 can be made of aluminum, molybdenum, titanium, tantalum, tungsten, copper, chromium, or the like.

A part of the elongated top gate electrode 316 corresponds to the top gate electrode of the highly sensitive TFT 310. In a planar view as illustrated in FIG. 4, the elongated top gate electrode 316 overlaps the oxide semiconductor film 312. The overlap part includes the part of the oxide semiconductor film 312 exposed from the space between the source electrode 313 and the drain electrode 314. The part of the top gate insulating layer 315 located between the top gate electrode and the oxide semiconductor film 312 of the highly sensitive TFT 310 corresponds to the top gate insulating film of the highly sensitive TFT 310.

A protection film 351 is provided to cover the whole highly sensitive TFT 310 as illustrated in FIG. 4. The protection film 351 can be made of epoxy resin. The protection film 351 is in contact with a part of the elongated top gate electrode 316 and the top gate insulating layer 315. A sensitive film 317 is provided above and in contact with the elongated top gate electrode 316 in the part outside the protection film 351 (the part exposed from the protection film 351).

The sensitive film 317 is exposed to and in direct contact with a sample solution 371. The sensitive film 317 is made of an organic or inorganic material. The sensitive film 317 reacts to a specific kind of ions to generate an electrical double layer at the interface with the sample solution 371. The electrical double layer changes the interfacial potential of the channel in the oxide semiconductor film 312 through the elongated top gate electrode 316. The variation in potential caused by the electrical double layer depends on the ion concentration of the sample solution 371.

The low sensitive TFT 330 includes a bottom gate electrode 331 on the insulating substrate 301 and an oxide semiconductor film 332 located upper than the bottom gate electrode 331. In a planar view, the bottom gate electrode 331 overlaps the oxide semiconductor film 332. A part of the bottom gate insulating layer 302 is located between the bottom gate electrode 331 and the oxide semiconductor film 332. The bottom gate insulating layer 302 is in direct contact with the bottom gate electrode 331 and the oxide semiconductor film 332. The bottom gate electrode 331 can be made of the same material as the bottom gate electrode 311. The oxide semiconductor film 332 can be made of the same material as the oxide semiconductor film 312.

The low sensitive TFT 330 includes a source electrode 333 and a drain electrode 334 each in direct contact with a different end of the oxide semiconductor film 332. A part of the oxide semiconductor film 332 is exposed from the space between the source electrode 333 and the drain electrode 334. The source electrode 333 and the drain electrode 334 can be made of the same material as the source electrode 313 and the drain electrode 314.

A top gate insulating layer 335 covers the oxide semiconductor film 332, the source electrode 333, and the drain electrode 334. Further, an elongated top gate electrode 336 is disposed above the top gate insulating layer 335. The top gate insulating layer 335 in the configuration example of FIGS. 3 and 4 is made of the same material as the top gate insulating layer 315 of the highly sensitive TFT 310. The top gate insulating layer 335 is thicker than the top gate insulating layer 315 of the highly sensitive TFT 310. The elongated top gate electrode 336 can be made of the same material as the elongated top gate electrode 316.

A part of the elongated top gate electrode 336 corresponds to the top gate electrode of the low sensitive TFT 330. In a planar view as illustrated in FIG. 4, the elongated top gate electrode 336 overlaps the oxide semiconductor film 332. The overlap part includes the part of the oxide semiconductor film 332 exposed from the space between the source electrode 333 and the drain electrode 334. The part of the top gate insulating layer 335 located between the top gate electrode and the oxide semiconductor film 332 of the low sensitive TFT 330 corresponds to the top gate insulating film of the low sensitive TFT 330.

A protection film 353 is provided to cover the whole low sensitive TFT 330 as illustrated in FIG. 4. The protection film 353 can be made of the same material as the protection film 351. The protection film 353 is in contact with a part of the elongated top gate electrode 336 and the top gate insulating layer 335. The protection films 351 and 353 can be different separate films or parts of one unseparated film.

A sensitive film 337 is provided above and in contact with the elongated top gate electrode 336 in the part outside the protection film 353 (the part exposed from the protection film 353). The sensitive film 337 is exposed to and in direct contact with the sample solution 371. The sensitive film 337 is made of the same material as the sensitive film 317. The sensitive films 337 and 317 in the configuration example of FIG. 3 have the same thickness.

The sensitive film 337 reacts to a specific kind of ions to generate an electrical double layer at the interface with the sample solution 371. The electrical double layer changes the interfacial potential of the channel in the oxide semiconductor film 332 through the elongated top gate electrode 336. The variation in potential caused by the electrical double layer depends on the ion concentration of the sample solution 371.

The source electrode 313 of the highly sensitive TFT 310 and the source electrode 333 of the low sensitive TFT 330 are electrically connected by a metal reference electrode 305 and these are at the same potential. The metal reference electrode 305 can be made of gold or platinum.

The metal reference electrode 305 is in direct contact with the source electrode 313 of the highly sensitive TFT 310 through a contact hole in the top gate insulating layer 315. The metal reference electrode 305 is also in direct contact with the source electrode 333 of the low sensitive TFT 330 through a contact hole in the top gate insulating layer 335.

In the configuration example of FIG. 3, a part of the metal reference electrode 305 is exposed to the sample solution 371 from the protection films 351 and 353 and in direct contact with the sample solution 371.

Each of the highly sensitive TFT 310 and the low sensitive TFT 330 has a top gate electrode and a bottom gate electrode. The sensitivities of these TFTs to detect an ion concentration depend on the ratio of the electrostatic capacity TC per unit area of the top gate insulating film to the electrostatic capacity BC per unit area of the bottom gate insulating film. When the value (TC/BC) of the ratio of the electrostatic capacity TC per unit area of the top gate insulating film to the electrostatic capacity BC per unit area of the bottom gate insulating film is larger, a higher sensitivity is attained. To raise the sensitivity of a TFT, the electrostatic capacity TC of its top gate insulating film is configured to be larger than the electrostatic capacity BC of the bottom gate insulating film.

In the configuration example of FIG. 3, the top gate insulating layer 315 is thinner than the top gate insulating layer 335 and these layers are made of the same material. Accordingly, the top gate insulating film of the highly sensitive TFT 310 has an electrostatic capacity larger than the electrostatic capacity of the top gate insulating film of the low sensitive TFT 330. The bottom gate insulating films of the highly sensitive TFT 310 and the low sensitive TFT 330 have the same electrostatic capacity. Accordingly, the highly sensitive TFT 310 has a higher sensitivity than the sensitivity of the low sensitive TFT 330.

In the configuration described with reference to FIGS. 3 and 4, the top gate insulating film of the highly sensitive TFT 310 of a first field-effect transistor is thinner than the top gate insulating film of the low sensitive TFT 330 of a second field-effect transistor. As a result, the sensitivity of the combination of the highly sensitive TFT 310 and the sensitive film 317 of a first ion-sensitive film is higher than the sensitivity of the combination of the low sensitive TFT 330 and the sensitive film 337 of a second ion-sensitive film.

Driving of Sensor TFT Pair

Figure 5:
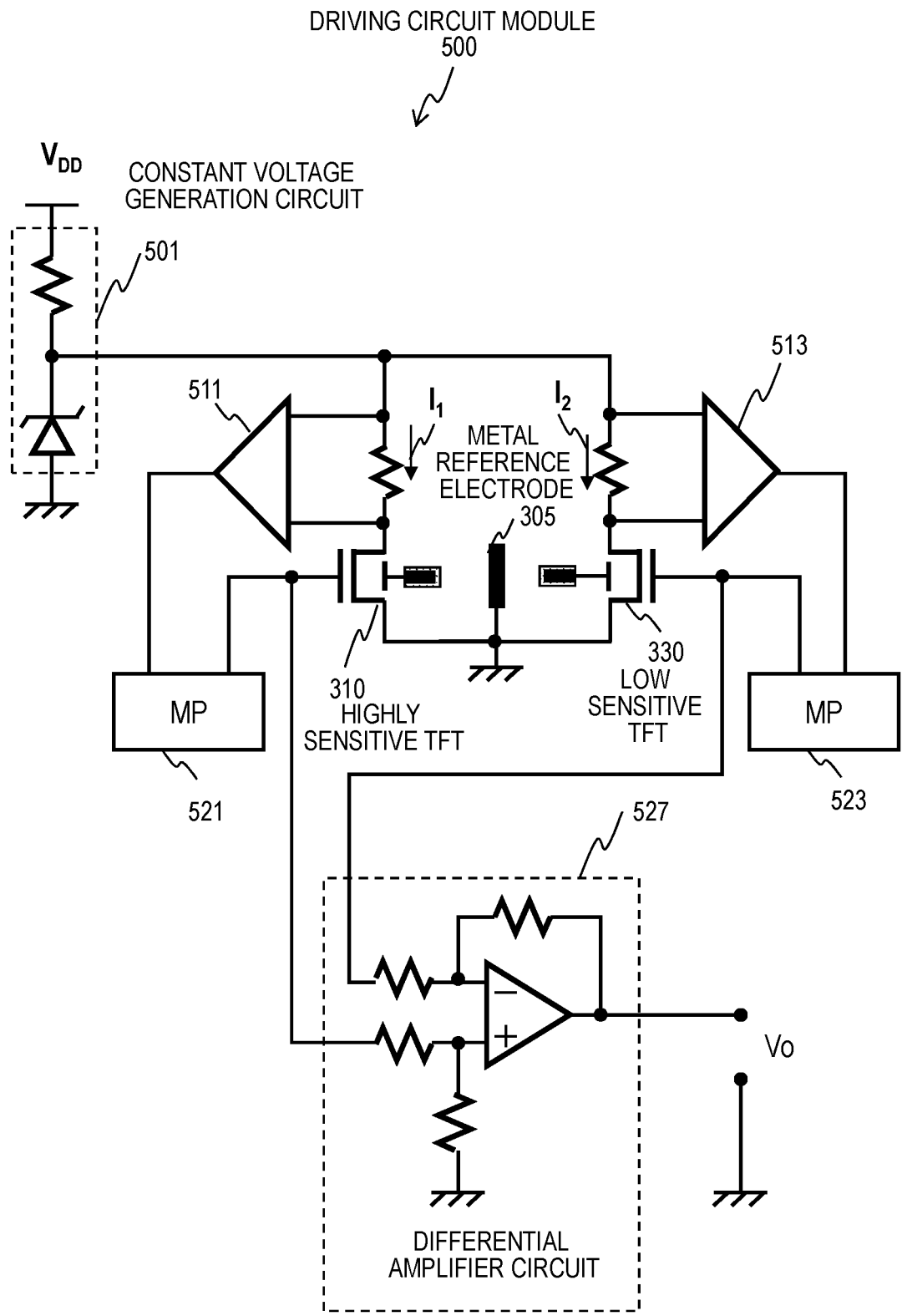
FIG. 5 illustrates an example of the circuitry for measuring the concentration of specific ions in a sample solution from a sensing signal from a highly sensitive TFT and a sensing signal from a low sensitive TFT.

FIG. 5 illustrates an example of the circuitry for measuring the concentration of specific ions in a sample solution 371 from a sensing signal from the highly sensitive TFT 310 and a sensing signal from the low sensitive TFT 330. FIG. 5 illustrates merely an example of such circuitry; different circuitry can be employed.

A driving circuit module 500 includes microprocessors (MPs) 521 and 523, a constant voltage generation circuit 501, current-voltage conversion circuits 511 and 513, and a differential amplifier circuit 527. The constant voltage generated by the constant voltage generation circuit 501 is applied across the source and the drain of each of the highly sensitive TFT 310 and the low sensitive TFT 330.

The current-voltage conversion circuit 511 detects a current $I_1$ flowing between the source and the drain of the highly sensitive TFT 310 as a voltage. The microprocessor 521 controls the bottom gate potential (the voltage between the bottom gate and the source) of the highly sensitive TFT 310 so that the voltage detected by the current-voltage conversion circuit 511 is constant or the drain current of the highly sensitive TFT 310 is constant.

The current-voltage conversion circuit 513 detects a current $I_2$ flowing between the source and the drain of the low sensitive TFT 330 as a voltage. The microprocessor 523 controls the bottom gate potential (the voltage between the bottom gate and the source) of the low sensitive TFT 330 so that the voltage detected by the current-voltage conversion circuit 513 is constant or the drain current of the low sensitive TFT 330 is constant.

The bottom gate potential of the highly sensitive TFT 310 and the bottom gate potential of the low sensitive TFT 330 are input to the differential amplifier circuit 527. The differential amplifier circuit 527 outputs a voltage (potential) Vo in accordance with the difference between the bottom gate potential of the highly sensitive TFT 310 and the bottom gate potential of the low sensitive TFT 330. The voltage Vo varies with the ion concentration of the sample solution 371. The sensitivity of this ion sensor in this configuration example is proportional to the difference in sensitivity between the highly sensitive TFT 310 and the low sensitive TFT 330.

Figure 6:
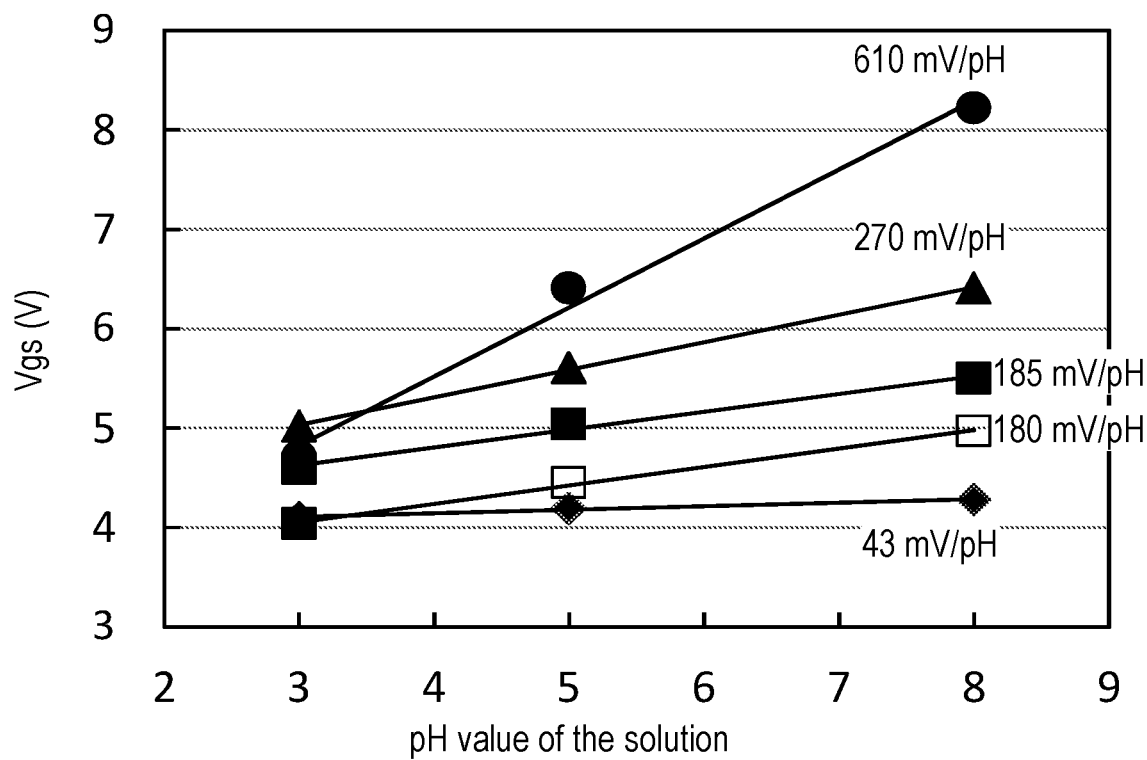
FIG. 6 illustrates examples of measurement results of the relation between the pH value of a sample liquid and the gate-source voltage Vgs on TFTs different in the ratio of the electrostatic capacity of the top gate insulating film to the electrostatic capacity of the bottom gate insulating film.

FIG. 6 illustrates examples of measurement results of the relation between the pH value of a sample solution and the gate-source voltage Vgs on TFTs different in the ratio (TC/BC) of the electrostatic capacity of the top gate insulating film to the electrostatic capacity of the bottom gate insulating film. The pH value represents the concentration of specific ions. The graph of FIG. 6 provides measurement results on TFTs showing reaction of 43 mV/pH, 180 mV/pH, 185 mV/pH, 270 mV/pH, and 610 mV/pH.

As indicated in FIG. 6, the sensitivities of TFTs depending on the ratio of the electrostatic capacity of the top gate insulating film to the electrostatic capacity of the bottom gate insulating film exhibit high linearity. Accordingly, an ion concentration can be measured with high accuracy by measuring the difference in output between TFTs having different sensitivities, as described with reference to FIG. 5.

Other Configuration Examples of Sensor TFT Pair

Figure 7:
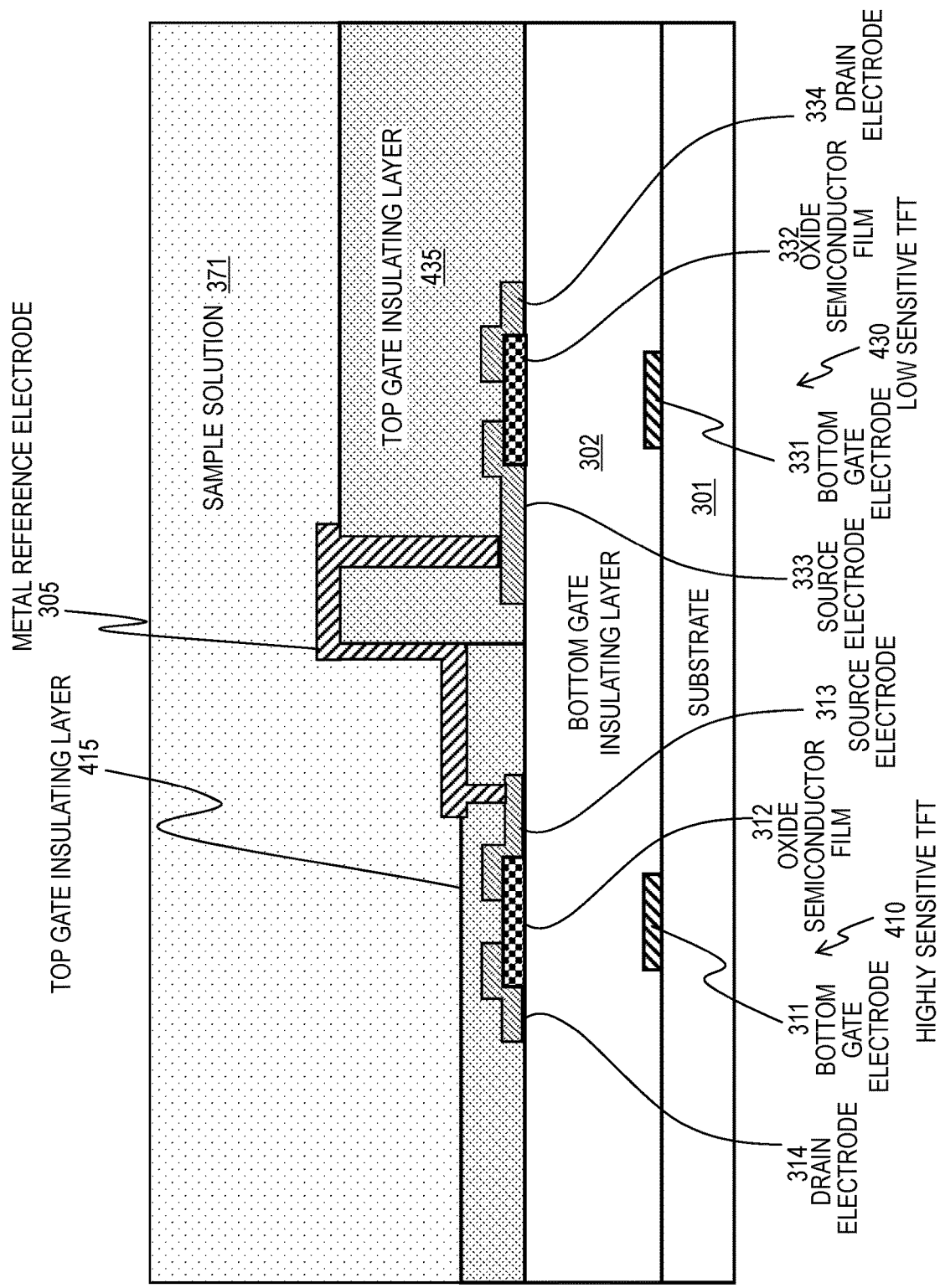
FIG. 7 illustrates another configuration example of a sensor TFT pair.

Hereinafter, different configuration examples for the sensor TFT pair are described. FIG. 7 illustrates a configuration example of a sensor TFT pair. The following mainly describes differences from the configuration example of FIG. 3. Compared to the configuration example of FIG. 3, the configuration example of FIG. 7 does not include the sensitive films 317 and 337, the protection films 351 and 353, and the elongated top gate electrodes 316 and 336. Furthermore, the configuration example of FIG. 7 includes top gate insulating layers 415 and 435 in place of the top gate insulating layers 315 and 335 in the configuration example of FIG. 3.

The top gate insulating layers 415 and 435 directly contact a sample solution 371 to also function as ion-sensitive films. The top gate insulating layers 415 and 435 are made of the same material, for example, silicon oxide. The top gate insulating layers 415 and 435 have different thicknesses; the top gate insulating layer 415 is thinner than the top gate insulating layer 435. Accordingly, the highly sensitive TFT 410 has a sensitivity higher than that of the low sensitive TFT 430, like in the configuration example of FIG. 3.

In the configuration described with reference to FIG. 7, the top gate insulating film of the highly sensitive TFT 410 of a first field-effect transistor is included in the part of the top gate insulating layer 415 that functions as an ion-sensitive film and the top gate insulating film of the low sensitive TFT 430 of a second field-effect transistor is included in the part of the top gate insulating layer 435 that functions as an ion-sensitive film. The top gate insulating layer 415 is thinner than the top gate insulating layer 435.

Figure 8:
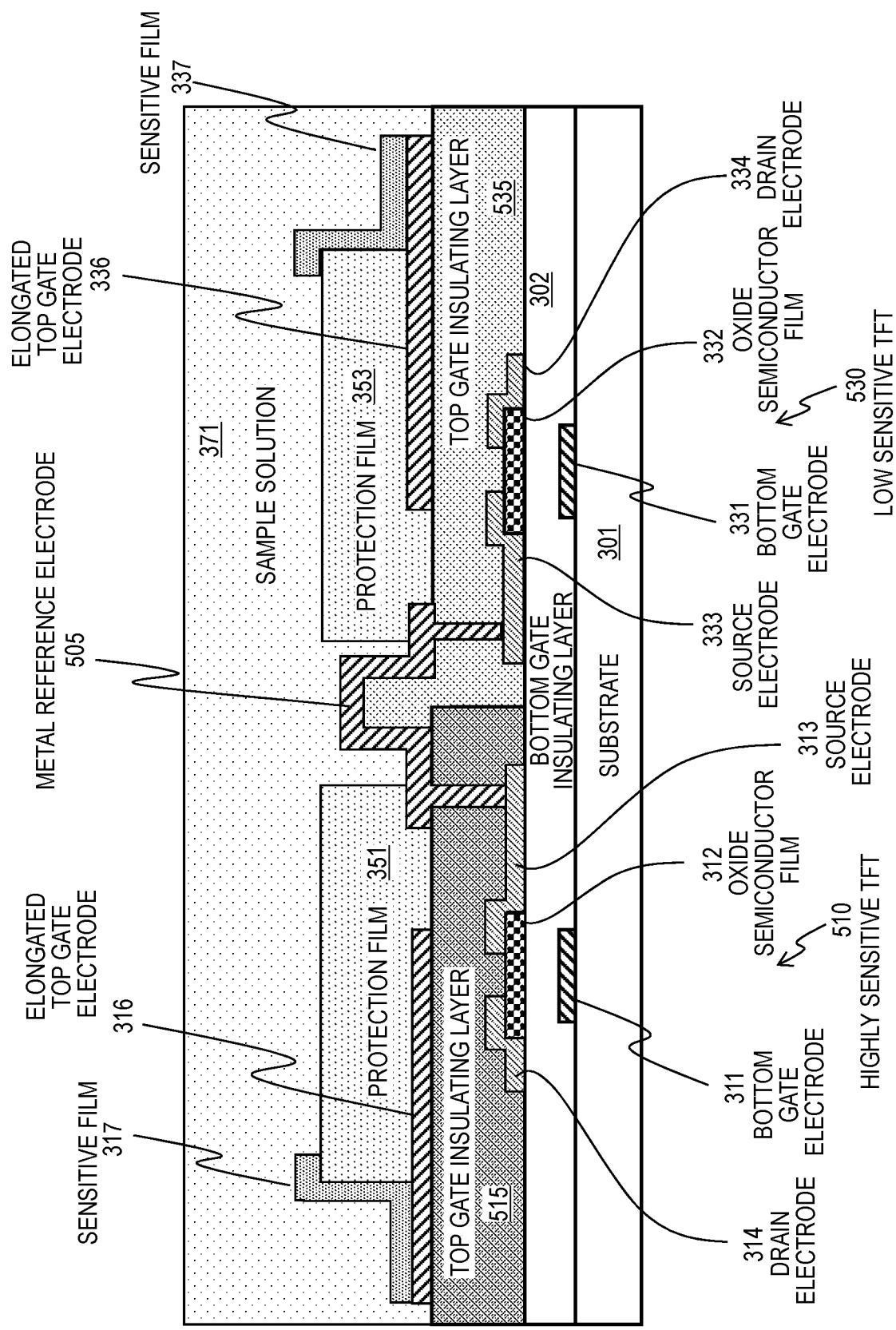
FIG. 8 illustrates still another configuration example of a sensor TFT pair.

FIG. 8 illustrates still another configuration example of a sensor TFT pair. The following mainly describes differences from the configuration example of FIG. 3. The configuration example of FIG. 8 includes top gate insulating layers 515 and 535 in place of the top gate insulating layers 315 and 335 in the configuration example of FIG. 3. The top gate insulating layers 515 and 535 are made of different materials having different permittivities. Specifically, the top gate insulating layer 515 has a relative permittivity higher than the relative permittivity of the top gate insulating layer 535. For example, a high-k insulator can be used as the material having a high relative permittivity and silicon oxide or silicon nitride can be used as the material having a low relative permittivity. Examples of the high-k insulator include tantalum oxide, titanium oxide, aluminum oxide, and hafnium oxide.

The top gate insulating film of the highly sensitive TFT 510 is a part of the top gate insulating layer 515 located between the top gate electrode and the oxide semiconductor film 312. The top gate insulating film of the low sensitive TFT 530 is a part of the top gate insulating layer 535 located between the top gate electrode and the oxide semiconductor film 332. In the configuration example of FIG. 8, the top gate insulating film of the highly sensitive TFT 510 has a thickness equal to the thickness of the top gate insulating film of the low sensitive TFT 530.

A top gate insulating film having a high relative permittivity means that the top gate insulating film has a large electrostatic capacity per unit area. Accordingly, the sensitivity of the highly sensitive TFT 510 is higher than the sensitivity of the low sensitive TFT 530.

The top gate insulating layer 535 in the configuration example of FIG. 8 has a projection between the two TFTs 510 and 530. A metal reference electrode 505 is provided to cover this projection.

In the configuration example of FIG. 8, the relative permittivity of the top gate insulating film of the highly sensitive TFT 510 of the first field-effect transistor is higher than the relative permittivity of the top gate insulating film of the low sensitive TFT 530 of the second field-effect transistor, as described above. The sensitivity of the combination of the highly sensitive TFT 510 and the sensitive film 317 is higher than the sensitivity of the combination of the low sensitive TFT 530 and the sensitive film 337.

As described with reference to FIGS. 3 and 8, the difference in thickness or relative permittivity between the top gate insulating films of the two TFTs leads to difference in sensitivity between the two TFTs. The top gate insulating films of the two TFTs can be different in both thickness and relative permittivity. The sensitivity of a TFT depends on the ratio of the electrostatic capacity per unit area of the top gate insulating film to the electrostatic capacity per unit area of the bottom gate insulating film. Accordingly, two TFTs can have different sensitivities by making their bottom gate insulating films have different characteristics.

Figure 9:
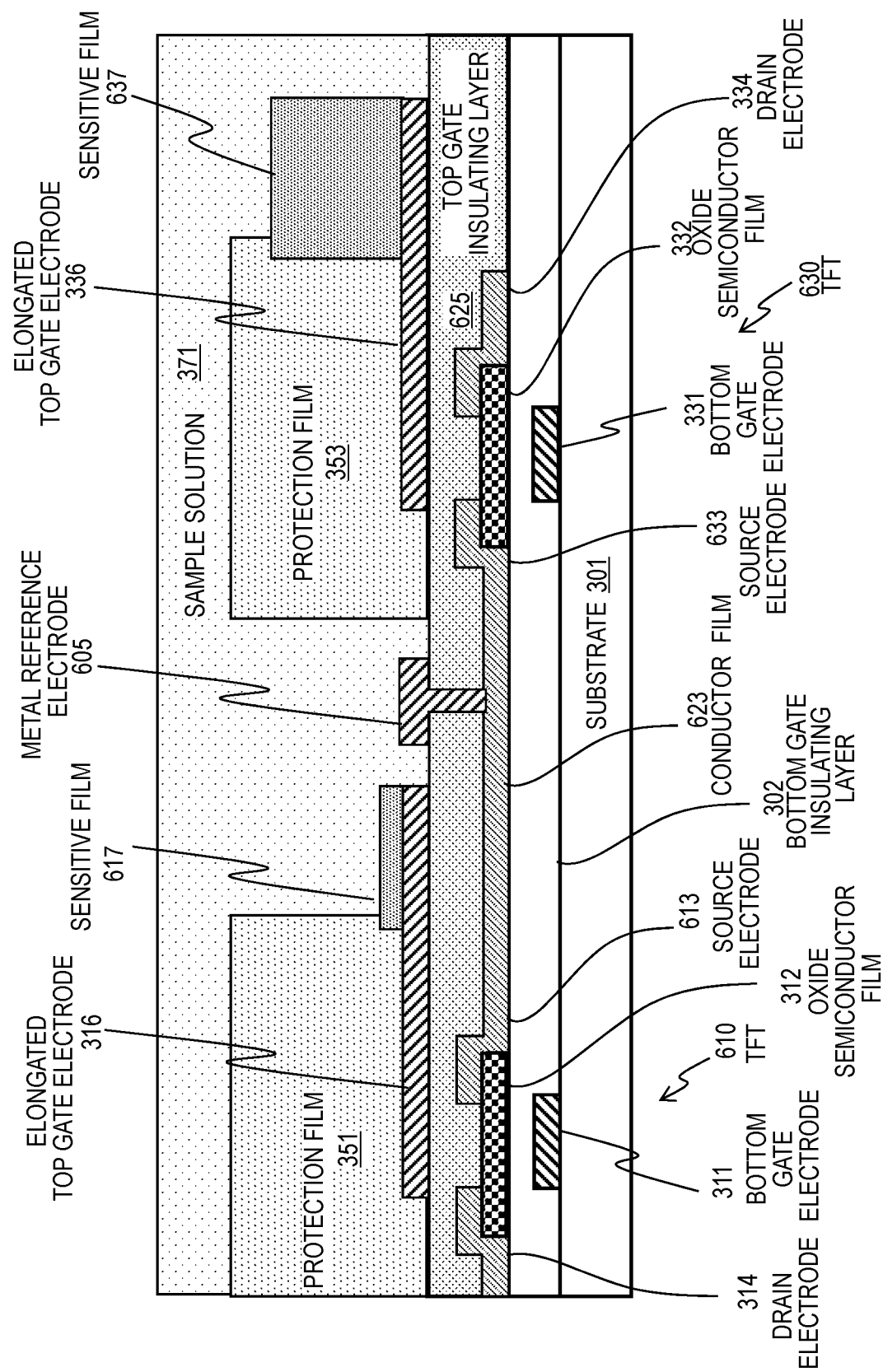
FIG. 9 illustrates still another configuration example of a sensor TFT pair.

FIG. 9 illustrates still another configuration example of a sensor TFT pair. The following mainly describes differences from the configuration example of FIG. 3. In the configuration example of FIG. 9, the sensitive films for two sensor TFTs have different thicknesses. When a sensitive film is thicker, the sensor device including a sensor TFT and the sensitive film has a lower sensitivity.

In the configuration example of FIG. 9, the TFT 610 and the TFT 630 have the identical configurations and the sensitive film 617 for providing a top gate potential to the TFT 610 is thinner than the sensitive film 637 for providing a top gate potential to the TFT 630. The sensitive films 617 and 637 are made of the same material. Accordingly, the sensitivity of the combination of the TFT 610 and the sensitive film 617 is higher than the sensitivity of the combination of the TFT 630 and the sensitive film 637.

The top gate insulating films of the TFTs 610 and 630 in the configuration example of FIG. 9 are included in the same top gate insulating layer 625. Accordingly, the top gate insulating films of the TFTs 610 and 630 are made of the same material and they have the same thickness.

The source electrodes 613 and 633 of the TFTs 610 and 630 in the configuration example of FIG. 9 are parts of a conductor film 623. The conductor film 623 can be made of the same material as the source electrodes in the configuration example of FIG. 3. The metal reference electrode 605 is electrically connected with the conductor film 623 through a contact hole opened through the top gate insulating layer 625.

In the configuration example of FIG. 9, the sensitivity of the combination of the TFT 610 of the first field-effect transistor and the sensitive film 617 of the first sensitive film is higher than the sensitivity of the combination of the TFT 630 of the second field-effect transistor and the sensitive film 637 of the second sensitive film, as described above.

Figure 10:
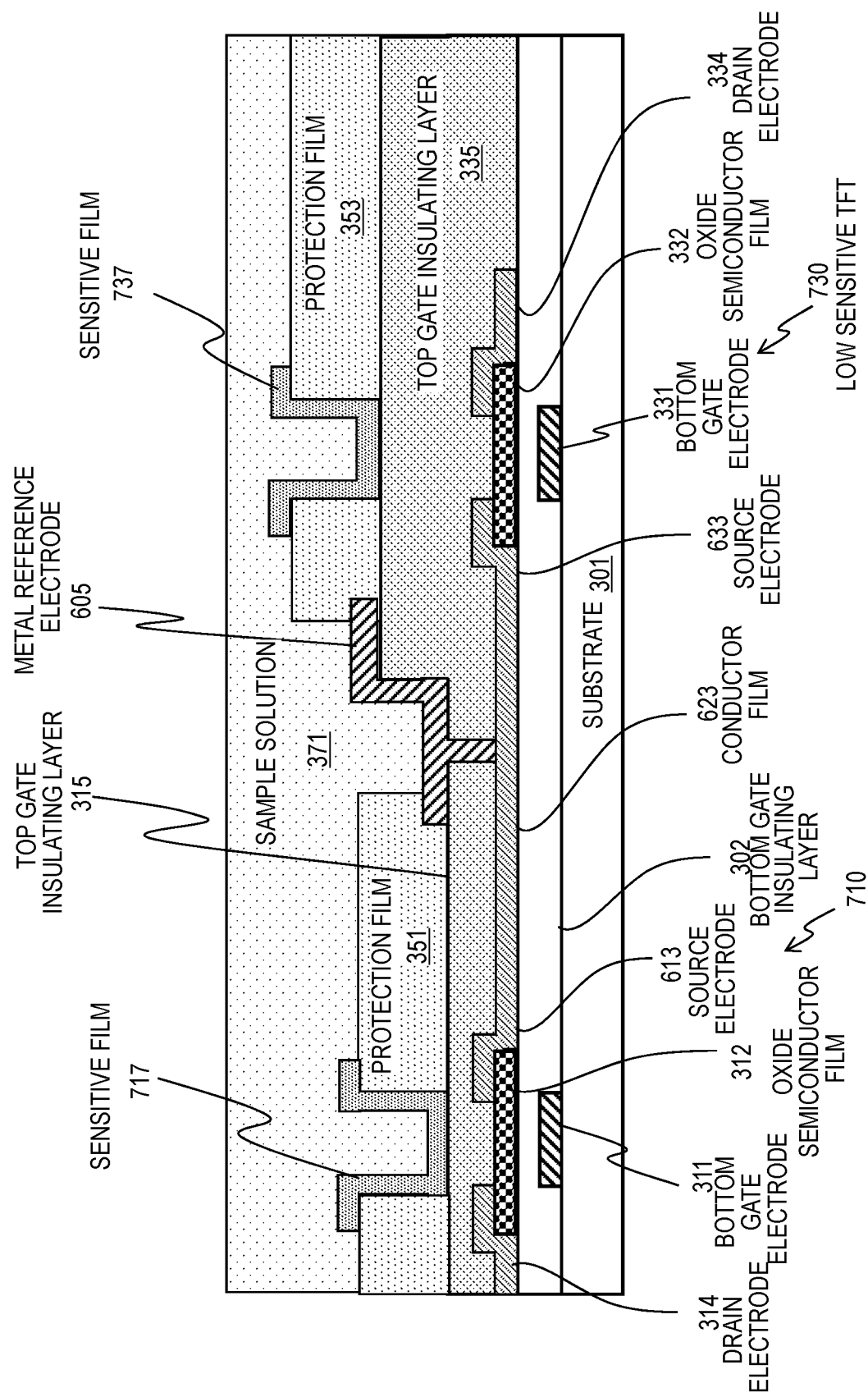
FIG. 10 illustrates still another configuration example of a sensor TFT pair.

FIG. 10 illustrates still another configuration example of a sensor TFT pair. The following mainly describes differences from the configuration example of FIG. 3. Compared to the configuration example of FIG. 3, the configuration example of FIG. 10 does not include the elongated top gate electrodes 316 and 336. The channels of these two TFTs are immersed into the sample solution 371 together with the sensitive films.

In the configuration example of FIG. 10, the sensitive film 717 is laid directly on the top gate insulating layer 315; they are in direct contact with each other. The sensitive film 737 is laid directly on the top gate insulating layer 335; they are in direct contact with each other. In a planar view, the sensitive film 717 covers the channel region of the highly sensitive TFT 710 and the sensitive film 737 covers the channel region of the low sensitive TFT 730. Each of the sensitive films 717 and 737 can cover only a part of the channel region of the associated TFT in the planar view.

The electric double layer at the interface between the sensitive film 717 and the sample solution 371 supplies a top gate potential to the highly sensitive TFT 710. The electric double layer at the interface between the sensitive film 737 and the sample solution 371 supplies a top gate potential to the low sensitive TFT 730. In the configuration example of FIG. 10, the top gate insulating film of the highly sensitive TFT 710 is thinner than the top gate insulating film of the low sensitive TFT 730, like in the configuration example of FIG. 3. This configuration provides the highly sensitive TFT 710 with a sensitivity higher than the sensitivity of the low sensitive TFT 730. The source electrodes 613 and 633 of the TFTs 710 and 730 in the configuration example of FIG. 10 are parts of a conductor film 623, like in the configuration example of FIG. 9.

Figure 11:
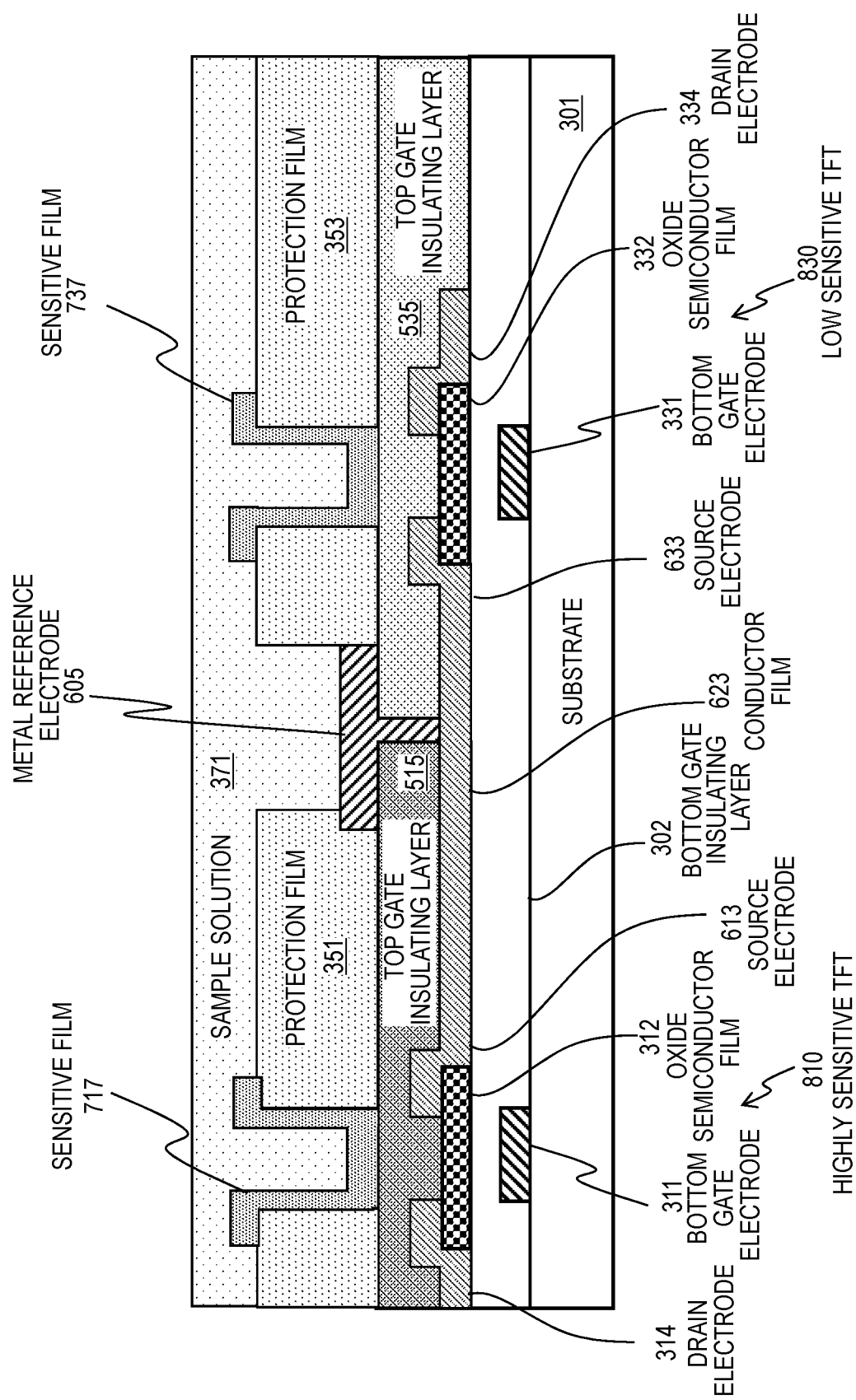
FIG. 11 illustrates still another configuration example of a sensor TFT pair.

FIG. 11 illustrates still another configuration example of a sensor TFT pair. The following mainly describes differences from the configuration example of FIG. 8. Compared to the configuration example of FIG. 8, the configuration example of FIG. 11 does not include the elongated top gate electrodes 316 and 336. The channels of these two TFTs are immersed into the sample solution 371 together with the sensitive films.

In the configuration example of FIG. 11, the sensitive film 717 is laid directly on the top gate insulating layer 515; they are in direct contact with each other. The sensitive film 737 is laid directly on the top gate insulating layer 535; they are in direct contact with each other. In a planar view, the sensitive film 717 covers the channel region of the highly sensitive TFT 810 and the sensitive film 737 covers the channel region of the low sensitive TFT 830. Each of the sensitive films 717 and 737 can cover only a part of the channel region of the associated TFT in the planar view.

The electric double layer at the interface between the sensitive film 717 and the sample solution 371 supplies a top gate potential to the highly sensitive TFT 810. The electric double layer at the interface between the sensitive film 737 and the sample solution 371 supplies a top gate potential to the low sensitive TFT 830. In the configuration example of FIG. 11, the top gate insulating film of the highly sensitive TFT 810 has a relative permittivity higher than that of the top gate insulating film of the low sensitive TFT 830. This configuration provides the highly sensitive TFT 810 with a sensitivity higher than the sensitivity of the low sensitive TFT 830.

In the configuration example of FIG. 11, the source electrodes 613 and 633 of the TFTs 810 and 830 are parts of a conductor film 623, like in the configuration example of FIG. 9. A metal reference electrode 605 is electrically connected with the conductor film 623 through a contact hole provided at the boundary between the top gate insulating layer 515 and the top gate insulating layer 535.

Figure 12:
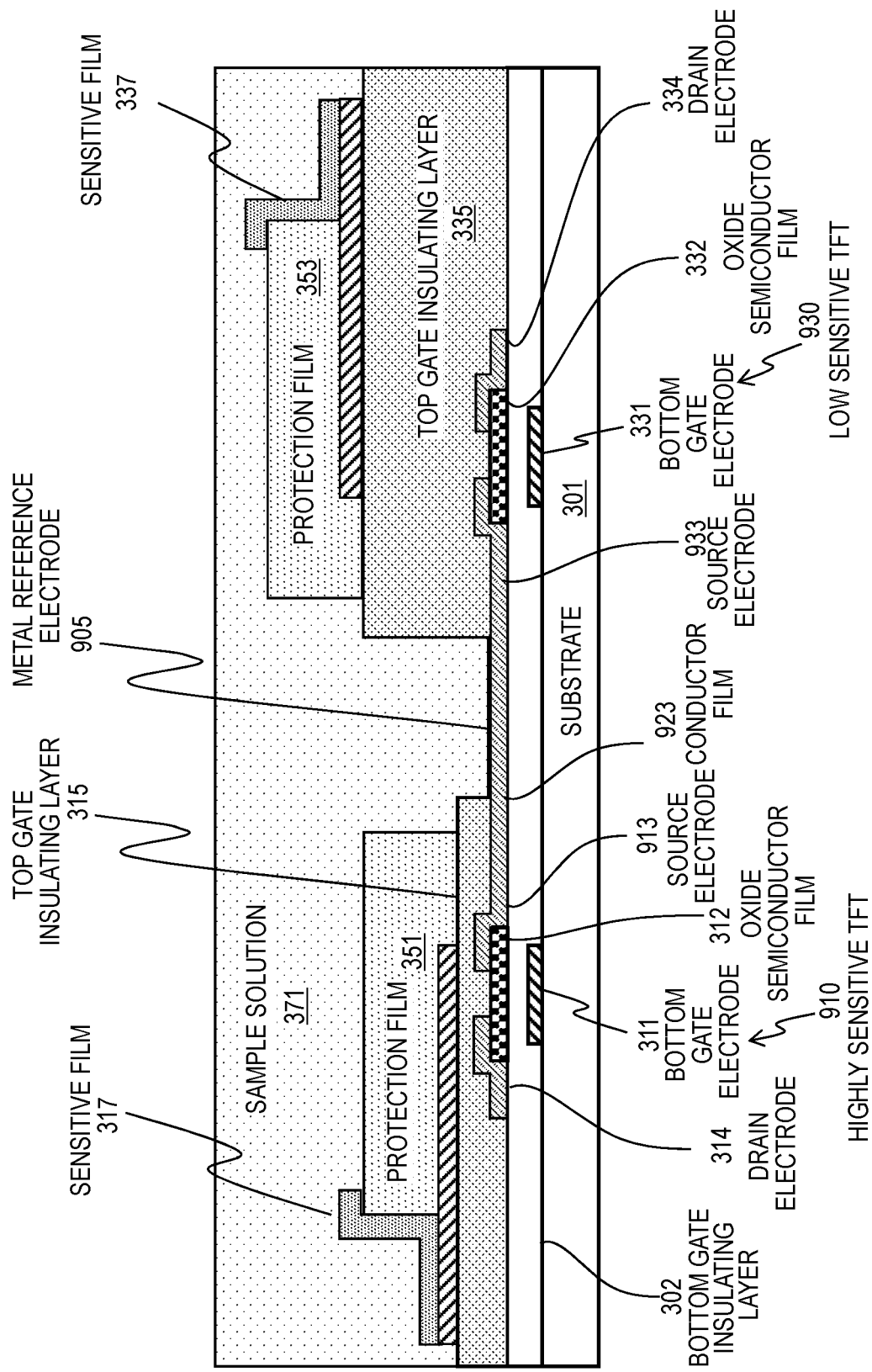
FIG. 12 illustrates still another configuration example of a sensor TFT pair.

FIG. 12 illustrates still another configuration example of a sensor TFT pair. The following mainly describes differences from the configuration example of FIG. 3. Compared to the configuration example of FIG. 3, the configuration example of FIG. 12 does not include the metal reference electrode 305. The source electrodes 913 and 933 of the two TFTs 910 and 930 are included in a conductor film 923. A part 905 of the conductor film 923 is exposed from the protection films to directly contact the sample solution 371. This part 905 of the conductor film 923 functions as a metal reference electrode. The conductor film 923 can be made of gold or platinum. As stated above, a source/drain electrode of the TFT 910 of the first field-effect transistor and a source/drain electrode of the TFT 930 of the second field-effect transistor are included in one conductor film 923 and a part of the conductor film 923 in direct contact with the sample solution 371 functions as a reference electrode.

In the configuration example of FIG. 12, the top gate insulating film of the highly sensitive TFT 910 is thinner than the top gate insulating film of the low sensitive TFT 930, like in the configuration example of FIG. 3. This configuration provides the highly sensitive TFT 910 with a sensitivity higher than the sensitivity of the low sensitive TFT 930.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:
1. An ion sensing device comprising:
a first field-effect transistor;
a second field-effect transistor;
a reference electrode configured to directly contact a sample solution;
a first ion-sensitive film; and
a second ion-sensitive film,
wherein each of the first field-effect transistor and the second field-effect transistor includes:

a semiconductor film;
a bottom gate electrode;
a bottom gate insulating film located between the bottom gate electrode and the semiconductor film; and
a top gate insulating film,
wherein the first ion-sensitive film is configured to generate a top gate potential with respect to the semiconductor film of the first field-effect transistor in accordance with an ion concentration of the sample solution when being in direct contact with a sample solution,
wherein the second ion-sensitive film is configured to generate a top gate potential with respect to the semiconductor film of the second field-effect transistor in accordance with the ion concentration of the sample solution when being in direct contact with the sample solution,
wherein a potential of the reference electrode is supplied to a source/drain of the semiconductor film of each of the first field-effect transistor and the second field-effect transistor,
wherein surface materials in contact with the sample solution for the first ion-sensitive film and the second ion-sensitive films are the same,
wherein a sensitivity of the combination of the first field-effect transistor and the first ion-sensitive film is higher than a sensitivity of the combination of the second field-effect transistor and the second ion-sensitive film and,
wherein a value of a ratio of an electrostatic capacity per unit area of the top gate insulating film to an electrostatic capacity per unit area of the bottom gate insulating film about the first field-effect transistor is larger than a value of a ratio of an electrostatic capacity per unit area of the top gate insulating film to an electrostatic capacity per unit area of the bottom gate insulating film about the second field-effect transistor.

2. The ion sensing device according to claim 1, wherein the top gate insulating film of the first field-effect transistor is thinner than the top gate insulating film of the second field-effect transistor.

3. The ion sensing device according to claim 1,
wherein the top gate insulating film of the first field-effect transistor is included in the first ion-sensitive film,
wherein the top gate insulating film of the second field-effect transistor is included in the second ion-sensitive film, and
wherein the top gate insulating film of the first field-effect transistor is thinner than the top gate insulating film of the second field-effect transistor.

4. The ion sensing device according to claim 1, wherein the top gate insulating film of the first field-effect transistor has a relative permittivity higher than a relative permittivity of the top gate insulating film of the second field-effect transistor.

5. The ion sensing device according to claim 1, wherein the first ion-sensitive film is thinner than the second ion-sensitive film.

6. The ion sensing device according to claim 1,
wherein each of the first field-effect transistor and the second field-effect transistor further includes:
a top gate electrode; and
an elongated electrode extending from the top gate electrode,
wherein the first ion-sensitive film is disposed on and in direct contact with the elongated electrode of the first field-effect transistor, and
wherein the second ion-sensitive film is disposed on and in direct contact with the elongated electrode of the second field-effect transistor.

7. The ion sensing device according to claim 1,
wherein the reference electrode is located on an insulating layer including the top gate insulating films of the first field-effect transistor and the second field-effect transistor, and
wherein the reference electrode is electrically connected with a source/drain of the first field-effect transistor and a source/drain of the second field-effect transistor through contact holes in the insulating layer.

8. The ion sensing device according to claim 1,
wherein a source/drain electrode of the first field-effect transistor and a source/drain electrode of the second field-effect transistor are included in one conductor film, and
wherein the reference electrode is a part of the conductor film configured to directly contact the sample solution.

9. The ion sensing device according to claim 1, further comprising a driver circuit,
wherein the first field-effect transistor, the second filed-effect transistor, and the reference electrode are electrically connected in such a manner that a source/drain of the first field-effect transistor, a source/drain of the second field-effect transistor, and the reference electrode have the same potential,
wherein the driver circuit is configured to:
control bottom gate potential of the first field-effect transistor to make drain current of the first field-effect transistor constant;
control bottom gate potential of the second field-effect transistor to make drain current of the second field-effect transistor constant; and
output a difference between the bottom gate potential of the first field-effect transistor and the bottom gate potential of the second field-effect transistor.

* * * * *